July 21, 1953  O. C. NIEDERER ET AL  2,646,168
DISCHARGE DEVICE FOR WEIGHING MECHANISM
Filed Dec. 3, 1947  2 Sheets-Sheet 1

INVENTORS
OTTO C. NIEDERER
BY HERBERT O. NIEDERER
OTTO NIEDERER
Albert Sperry
ATTORNEY July 21, 1953    O. C. NIEDERER ET AL    2,646,168
DISCHARGE DEVICE FOR WEIGHING MECHANISM
Filed Dec. 3, 1947      2 Sheets-Sheet 2
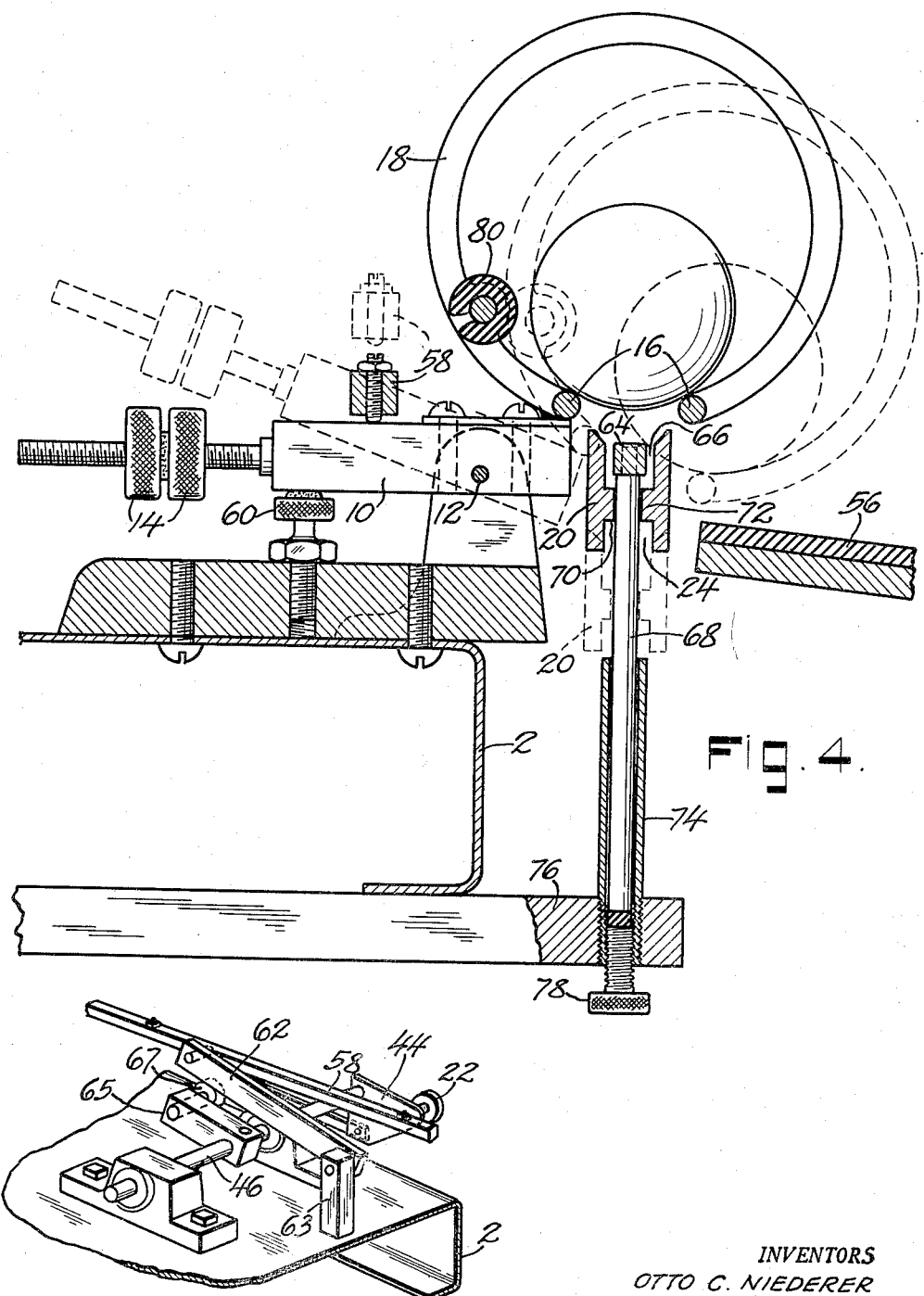
INVENTORS
OTTO C. NIEDERER
BY HERBERT O. NIEDERER
OTTO NIEDERER
Albert Sperry
ATTORNEY Patented July 21, 1953

2,646,168

UNITED STATES PATENT OFFICE 2,646,168

DISCHARGE DEVICE FOR WEIGHING MECHANISM

Otto C. Niederer, Herbert O. Niederer, and Otto Niederer, Titusville, N. J.

Application December 3, 1947, Serial No. 789,542

4 Claims. (Cl. 209—121)

This invention relates to mechanism for sorting or grading articles by weight and is directed particularly to means for effecting the movement of articles to weighing devices and for effecting the discharge of articles therefrom on completion of a weighing operation.

Weighing mechanism used in grading eggs and other articles are frequently provided with a series of weighing devices adjusted to respond to progressively decreasing weights and conveying means are provided for moving the articles to be sorted step by step from one weighing device to another. The weighing devices used in such mechanisms usually include a balance beam which carries an article support onto which each article is moved by the conveying means and the article support is tilted through an angle sufficient to dump or discharge the article from the support when the article is of the predetermined weight for which the device is adjusted. The operations of supplying the articles to and discharging the articles from the weighing devices are carried on in successive cycles. Typical mechanism of this character is shown and described in our issued Patent No. 2,246,597.

Mechanisms of this type are not always capable of sufficiently rapid and accurate operation to meet all conditions of use. Thus, for example, when the article being weighed is of borderline weight the balance beam moves relatively slowly, and as a result the article support may not be tilted sufficiently to insure discharge of the article therefrom within the time allowed for the weighing operation. In such cases the article may be engaged by the conveyor while the balance beam is still tilted, or the balance beam may be restored to a raised or neutral position before the article is discharged. Inaccurate weighing or injury to the articles may therefore result. Furthermore, the accuracy of the weighing operation is influenced by excessive wear on the bearings due to movement of the balance beam through a large arc. When the articles being weighed are eggs, any sudden or irregular movement of the eggs is harzardous, and if the eggs are allowed to fall too far or are moved too abruptly in being discharged from the supports there is danger of cracking or "checking" the shell. This condition is particularly serious at certain seasons of the year when the eggs generally have especially thin shells.

In accordance with our invention these objections to constructions of the prior art are overcome by providing weighing devices with discharge control means which serve to insure removal of articles from the article supports of the weighing devices upon limited tilting of the balance beam. Delays in delivery and uncertainty in operation are avoided and injury to the articles being weighed is overcome.

One of the objects of our invention is to provide weighing devices with a novel type of article discharge means.

Another object of our invention is to speed up the operation of weighing articles while increasing the accuracy of the operation.

A further object of our invention is to provide weighing devices having a tiltable balance beam with means for discharging articles from the device upon limited movement of the balance beam.

These and other objects and features of our invention will appear from the following description thereof in which reference is made to the figures of the accompanying drawing.

In the drawings:

Fig. 4 is a sectional view on a larger scale of a portion of the mechanism showing a preferred form of weighing and discharge means embodying our invention;

Fig. 5 is a perspective of a portion of the mechanism shown in Figs. 1 to 4 illustrating a typical locking means for the balance beams.

Figure 1:
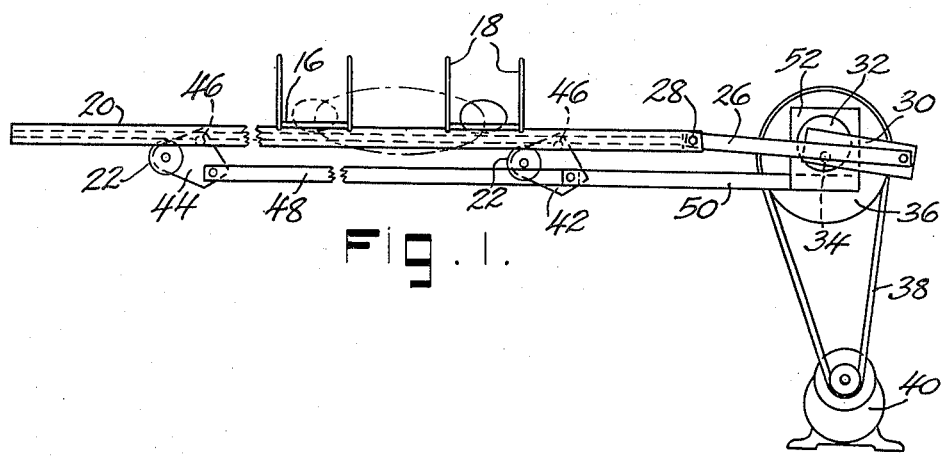
Fig. 1 is a diagrammatic front view of a typical mechanism embodying our invention.
Figure 2:
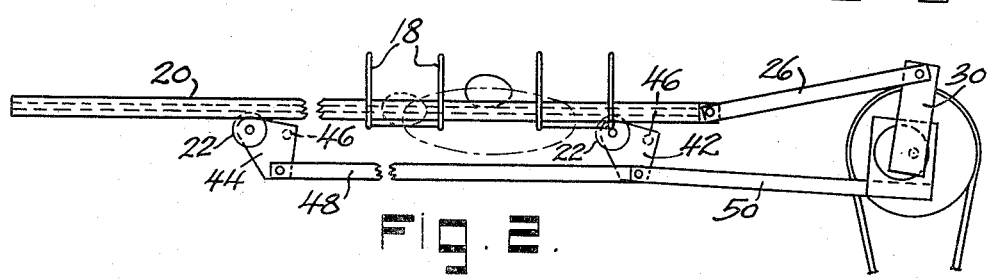
Fig. 2 is a diagrammatic illustration similar to Fig. 1 showing the elements in an alternative position.
Figure 3:
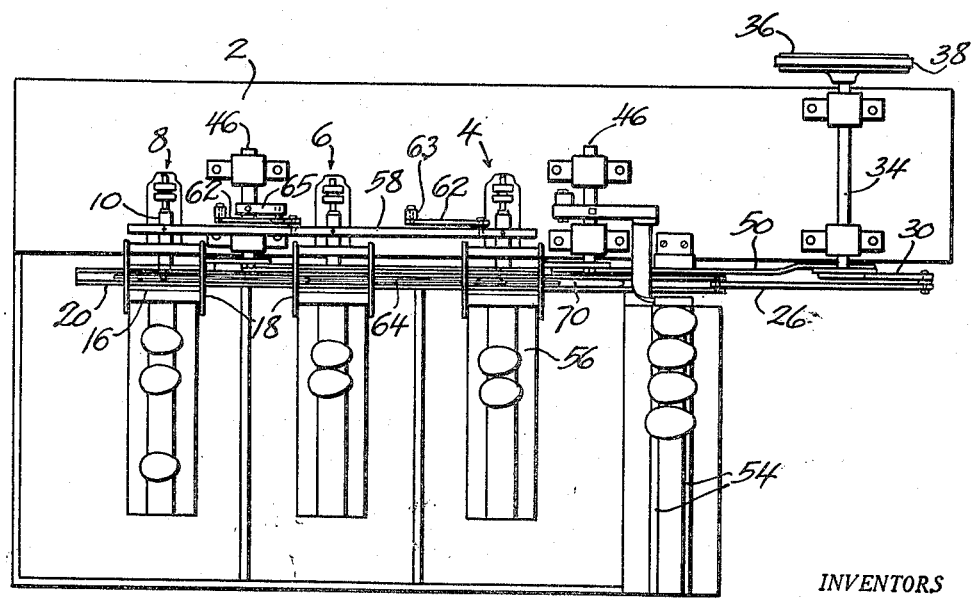
Fig. 3 is a top plan view of a typical construction embodying our invention.

In that form of our invention chosen for purposes of illustration in the drawings the mechanism is designed for use in grading eggs by weight and has a platform 2 upon which are mounted a series of weighing devices indicated at 4, 6 and 8 adjusted to respond to progressively decreasing weights. Each weighing device has a balance beam 10 pivotally mounted on the supports 12 and having an adjusting weight 14. Each weighing device also is provided with article receiving means in the form of spaced parallel rails 16 connected together by the loops 18 and movable with the balance beam from the horizontal weighing position shown in full lines in Fig. 4 to the tilted discharging position shown in dotted lines therein.

When in the horizontal weighing position the article receiving means of all of the weighing devices are in substantial alignment and the rails 16 thereof are parallel and spaced apart to permit movement of an article conveyor therebetween to raise the articles to be graded and to move them forward in successive steps and from one weighing device to the next longitudinally of the mechanism.

The article conveyor illustrated is in the form of a bar 20 which is generally H-shaped in cross section and is movable in an elliptical path upward and forward between the rails 16 so as to engage articles and raise them from the rails and move them on to the next weighing device. The conveyor bar with the articles thereon then moves downward so that the articles are lowered into place to be weighed by the next weighing device and the conveyor moves downward and back to perform another cycle of operation.

As shown the conveyor is supported adjacent its opposite ends by rollers 22 which extend into the downwardly facing channel 24 in the conveyor bar 20. The bar is reciprocated longitudinally by means of a link 26 connected at one end to the bar at 28 and connected at the other end to a crank arm 30 which is secured to a disc 32 rotated by the shaft 34 through pulley 36, belt 38 and motor 40. The conveyor bar is raised and lowered as it reciprocates by mounting the rollers 22 on oscillating plates 42 and 44 each of which is secured to a rocking shaft 46. The plates 42 and 44 are connected together by a rod 48 so that they will oscillate in unison. The plate 42 at the right hand end of the mechanism as seen in Fig. 1 is actuated by the rod 50 connected to a plate 52 which surrounds and engages the disc 32. The disc 32 is eccentrically mounted on shaft 34 and therefore the plate 52 is moved so as to reciprocate rod 50 so that it will rock the oscillating plate 42 and thereby rock the plate 44 to raise and lower the rollers 22 in unison. The conveyor bar is thus caused to move through an arcuate path between the rails 16 of the article supporting means to raise and advance the articles to be graded so that they are moved step by step along the mechanism in a series of operating cycles.

The articles are supplied to the conveyor by movement along the inclined tracks 54 into position above the conveyor 20 and are then raised and advanced to the first weighing device indicated at 4. If the egg or other article thus placed on the article receiving means of the first weighing device is of sufficient weight to tilt the balance beam and rails 16 the egg will be discharged onto the tray 56. However, if the egg is not heavy enough to actuate the first weighing device it will be picked up and moved on to the next weighing device 6 on the next cycle of operation of the conveyor. If the next weighing device 6 is not actuated by the egg it will be moved on step by step with each cycle of operation until the egg is discharged by another or final weighing device.

The tilting of the balance beams 10 is controlled by operation of a locking bar 58 which bears against the balance beams on the opposite side of the pivot supports 12 from the article receiving means 16. When the locking bar is lowered into engagement with the balance beams the rails 16 are held in locked positions and are maintained in alignment by means of the adjustable stop members 60 which limit the downward movement of the rear ends of the balance beams. The locking bar is connected at its opposite ends to the pivoted arms 62 pivotally mounted on the supports 63. The locking bar is raised periodically and in timed relation to the operation of the conveyor so as to release the weighing devices to perform their weighing operations while the conveyor bar is moving through the lower and rearward portion of each cycle of operation. For this purpose a lifting arm 65 is fixedly secured to the rocking shaft 46 to which the oscillating plate 44 is secured. A roller 67 is carried by the lifting arm 65 and therefore when the rocking shaft 46 is oscillated by plate 44 the lifting arm 65 is raised into position to cause roller 67 to engage and raise the adjacent pivoted arm 62. The arms 62 and locking bar 58 form a parallelogram type of linkage and therefore movement of the lifting arm 65 serves to raise the locking bar to release the weighing devices for operation during a predetermined portion of each cycle. When the lifting arm 65 is lowered the locking bar is returned to its lowered position to engage each balance beam and hold the balance beams and article supports in place during transfer of the eggs or articles from one weighing device to another.

The tilting of the balance beams and rails 16 which is necessary to effect the discharge of articles of predetermined weight from the weighing devices in many cases requires movement thereof through a relatively large arc, say 45 degrees or more. Since such movement causes undue wear on the bearings and causes the eggs or articles to fall or be discharged from the weighing device in a rough manner, we have provided discharge control means which serve to displace the article from the rails 16 upon limited tilting thereof. This further serves to insure the prompt discharge of eggs or articles which are of borderline weight which cause the balance beam to tilt relatively slowly or through a small arc within the time allowed for the weighing operation.

The discharge control means shown in Fig. 4 embodies a bar 64 which is located within the upwardly facing channel 66 of the H-shaped conveyor bar 20. The discharge bar 64 is provided with downwardly extending pins 68 which extend through elongated slots 70 in the web 72 of the conveyor bar. The lower ends of pins 68 extend into the tubular guide sleeves 74 mounted on supporting bars 76 secured adjacent the lower face of the platform 2. With this construction the bar 64 is raised and lowered by conveyor 20 but is held against longitudinal movement by the sleeves 74. Adjusting screws 78 extend upward into the lower ends of the sleeves 74 so as to be engaged by the pins 68 to limit downward movement of the discharge bar and to hold it at a predetermined elevation as the conveyor 20 continues to move downward and through the lower portion of its elliptical path of movement.

The lowered position of the discharge bar 64 is only slightly below the level of the rails 16 of the article supporting means and therefore as soon as any balance beam tilts through even in a very small arc the article thereon is engaged by the discharge bar. While the discharge bar 64 is centered with respect to the rails 16 of the article supporting means when the balance beam is in its neutral or locked position, tilting of the balance beam and rails serves to move the rails forward so that the discharge bar engages the article on rails 16 at the rear of its center of gravity and at a point between the pivot of the balance beam and the center of the article supporting means. The bar therefore serves to push the article forward off the rails 16 as shown in dotted lines in Fig. 4. Further, in order to insure proper discharge of the articles the loops 18 of the article supporting means are provided with a rubber covered rail 80 which is positioned at the rear and above the rails 16. On tilting of the balance beam the rail 80 also moves forward above the discharge bar 64 so that the discharge bar and rail 80 operate to prevent any egg or article from rolling rearward toward the balance beam. Discharge of the article onto the tray 56 will therefore occur in response to very limited tilting of the balance beam.

In actual practice eggs may be discharged from the article supporting means when the balance beam tilts through an arc of only 15 to 20 degrees. The eggs are therefore removed gently from the rails 16 and the tray 56 can be located much closer to the neutral position of the rails so that all danger of severe bumping or falling which might injure or crack a very thin shell is overcome. Moreover, the accuracy of weighing is improved since it is not necessary for the balance beam to tilt through a large arc to discharge articles from the rails 16. The prompt discharge of the eggs also eliminates any danger of injury to eggs by movement of the conveyor bar upward into engagement with an egg before the locking bar has been actuated or while the balance beam is tilted or improperly positioned. The speed and accuracy with which the eggs may be graded is thus increased whereas "checking" or injury to the eggs is completely eliminated.

While we have shown and described a typical and preferred form of mechanism embodying our invention, it will be apparent that numerous changes and modifications may be made in the form, construction and arrangement of the elements employed without departing from the teachings of our invention. In view thereof, it should be understood that the forms of our invention shown in the drawings and herein described are intended to be illustrative only and are not intended to limit the scope of our invention.

We claim:

1. A weighing device comprising a balance beam, a support about which said balance beam is movable, article supporting means carried by said balance beam and including spaced rails located near one end of the balance beam, means for holding said balance beam and article supporting means in a predetermined neutral position preparatory to a weighing operation, article discharging means held in a predetermined position between and below the rails of said article supporting means when the latter is in said neutral position and at a point in the path of movement of said rails during a weighing operation such that the discharging means will project between the rails and displace an article supported thereby when the balance beam is tilted, and means positioned above said rails and between the latter and said pivot to prevent an article displaced by the discharging means from moving toward said pivot.

2. A weighing device comprising a balance beam, a support about which said balance beam is movable, article supporting means carried by said balance beam and including spaced rails located near one end of the balance beam, means for holding said balance beam and article supporting means in a predetermined neutral position preparatory to a weighing operation, article discharging means held in a predetermined position between and below the rails of said article supporting means when the latter is in said neutral position and at a point in the path of movement of said rails during a weighing operation such that the discharging means will project between the rails and displace an article supported thereby when the balance beam is tilted, and a guard rail extending parallel to and located above the rails of said article supporting means on that side of the latter adjacent said pivot for preventing an article displaced by said discharging means from moving toward said pivot.

3. An egg weighing device comprising a balance beam, pivot means about which said balance beam is movable to a discharge position during a weighing operation, a pair of spaced rails fixedly mounted on said balance beam and extending parallel to said pivot means, conveying means movable vertically and horizontally between said rails for lifting and advancing and thereafter depositing an egg on said supporting means with the long axis of the egg parallel to said rails as the conveyor moves downward to a lowered position below said rails, locking means for holding said balance beam and rails in predetermined position preparatory to a weighing operation, said locking means being removable to release said balance beam for movement to said discharge position during a weighing operation, a discharge bar movable vertically with said conveying means, and means for holding said discharge bar in a predetermined fixed position beneath and between said rails as the conveyor moves to said lowered position during a weighing operation, said discharge bar being positioned during the weighing operation between said pivot means and the center of said rails whereby an egg supported on said rails will be engaged by said discharge bar as the balance beam moves toward said discharge position to roll the egg about its long axis off said rails.

4. An egg grading device comprising a plurality of balance beams each provided with a pair of spaced egg receiving rails fixedly positioned thereon, egg conveying means including an elongated member presenting an upwardly facing channel, means for moving said member vertically and longitudinally between the egg receiving rails on the balance beams to raise eggs from the rails on one balance beam as the member is raised, and to advance and lower them onto the rails of another balance beam as the member moves to a lowered position below said rails, means for holding said balance beams and rails in a raised position between successive weighing operations, discharge bar located within the channel of said elongated member, and means for holding said discharge bar at a predetermined elevation below the raised position of the rails and in the path of movement of an egg supported on said rails when said rails move to a tilted position under control of the balance beam.

OTTO C. NIEDERER.
HERBERT O. NIEDERER.
OTTO NIEDERER.

References Cited in the file of this patent

UNITED STATES PATENTS

| Number | Name | Date |
| --- | --- | --- |
| 2,112,823 | Breuilh | Apr. 5, 1938 |
| 2,246,597 | Niederer | June 24, 1941 |

FOREIGN PATENTS

| Number | Country | Date |
| --- | --- | --- |
| 585,304 | Germany | Oct. 2, 1933 |
| 446,203 | Great Britain | Apr. 27, 1936 |